March 29, 1938.  E. PLESS  2,112,605

FILM DEVELOPING DEVICE

Filed Nov. 11, 1936  3 Sheets-Sheet 1

INVENTOR.
Ernst Pless
BY
ATTORNEY.

March 29, 1938.  E. PLESS  2,112,605

FILM DEVELOPING DEVICE

Filed Nov. 11, 1936  3 Sheets-Sheet 2

INVENTOR.
Ernst Pless
BY
ATTORNEY.

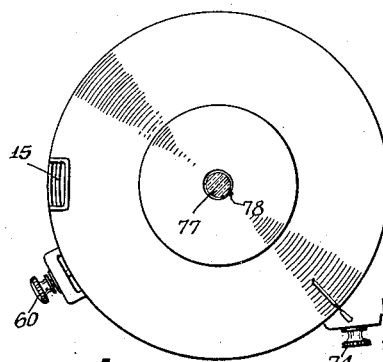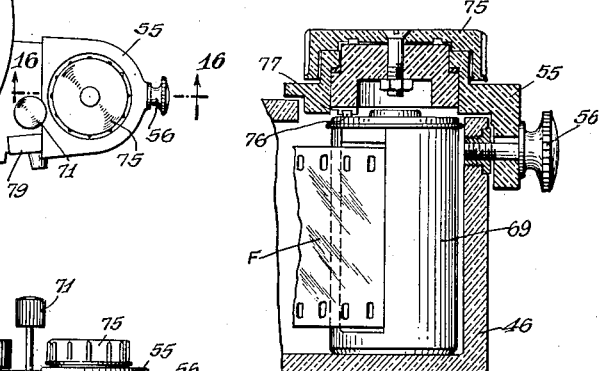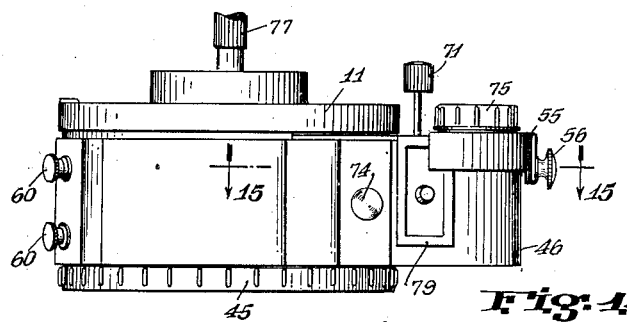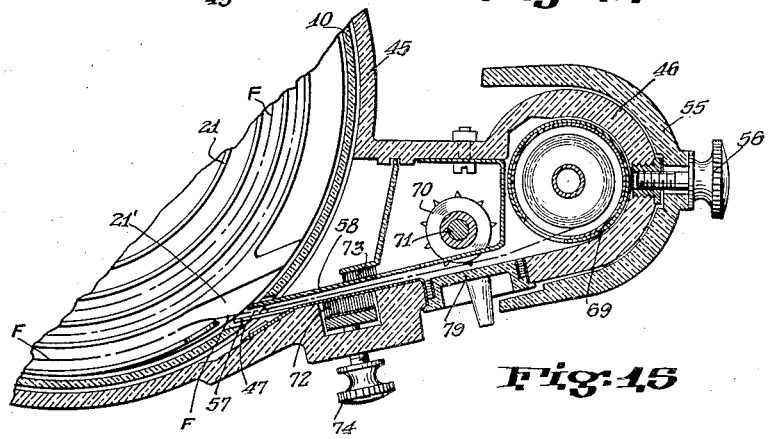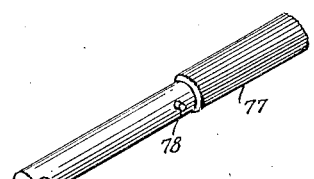

Patented Mar. 29, 1938

2,112,605

UNITED STATES PATENT OFFICE 2,112,605

FILM DEVELOPING DEVICE

Ernst Pless, Mauer, near Vienna, Austria, assignor of one-half to Hermann Dannowski, Jackson Heights, N. Y., and Albert W. Moser, New York, N. Y.

Application November 11, 1936, Serial No. 110,257 In Austria November 25, 1935

20 Claims. (Cl. 95—90.5)

The present invention relates to improvements in devices for the developing of photographic films, more particularly for developing roll films and objects of the invention are to provide means whereby a strip of film after exposure in a camera may be effectively developed without the danger of scratching or otherwise destroying the light sensitive emulsion.

More particularly the invention is concerned with devices for the developing of films in accordance with the time-temperature method, although not limited thereto. In accordance with this method of development now being extensively used, especially for developing fine grain negative film strips, the film is placed in a developing tank or receptacle, preferably in a spiral form, with adjacent convolutions sufficiently separated from each other by suitable spacing means and the developer in highly diluted condition introduced into the developing tank. The film is then allowed to develop slowly during a specified period dependent on the developing composition used, its concentration, etc., as specified by the manufacturer or determined by tests and experiments. No further manipulations are required on the part of the photographer except occasional agitation or stirring of the solution to ensure that all parts of the sensitive surface of the film are evenly acted upon by the fluid during the developing process. By closing the tank with a light tight cover, the entire process may be carried out in full daylight after the film has been placed in the tank in a dark room.

A further object of the invention is to provide a developing fixing and/or washing device which can be used substantially or entirely without the necessity of a dark room or light tight changing bag or the like in such a manner as to make the photographer independent of any special locality and to enable him to develop a film immediately after exposure and at places lacking any dark room facilities, such as when traveling, and under conditions when immediate development is advisable for preserving the film, especially in the tropics.

Another object of the invention is to provide a novel developing reel adapted for winding a film strip thereon without moving or rotation of any mechanical parts.

Another object is to provide a developing reel for holding a film strip wound thereon and spaced by a spiral guideway whereby the threading or insertion of the film on to the spiral of the developing reel is greatly facilitated.

Another object is the provision of means for moving the reel holding a film strip to be developed spirally wound thereon both by rotation and in a length-wise direction to secure efficient agitation of the developing fluid and to ensure even action upon all parts of the sensitive surface of the film.

A further object of the invention resides in provision of means whereby a film may be inserted into a light-proof developing tank or receptacle in full daylight and wound on to a spiral holder or the equivalent placed within the tank without causing light to effect the sensitive surface of the film.

A still further object is the provision of a novel type of adjustable developing reel embodying features of construction whereby various sizes of roll film of predetermined standard widths may be developed by means of the same developing device.

Other objects and advantages of the invention will become apparent during the course of the following detailed description taken with reference to the accompanying drawings forming part of this specification, and in which Fig. 1 is a vertical cross-section of a developing tank according to the invention adapted for darkroom loading and developing in full daylight.

Figure 6 is a side view of a modified form of developing tank according to the invention embodying features of construction enabling the performance of all operations including both inserting of the film into the developing tank as well as the developing operations entirely in daylight in such a manner as to do away completely with the necessity of the dark room, changing bag, or the like.

Figure 13 is a top view of a modified form of a full daylight loading and developing tank adapted for developing film strips having edge perforations such as moving pictures film strips commonly used in miniature cameras.

Figure 14 is a side view of the tank shown in Figure 13.

Figure 15 is an enlarged partial cross-sectional view taken on line 15—15 of Figure 14 illustrating the feeding and insertion of the perforated film strip into the developing tank.

Figure 16 is an enlarged partial cross-sectional view taken on line 16—16 of Figure 13.

Figure 17 shows a locking rod for use in connection with a tank shown in Figures 13 to 16 to prevent rotation of the film holding reel relative to the tank during the feeding and insertion of the film into the latter.

Similar reference characters identify similar parts throughout the different views of the drawings.

Figure 1:
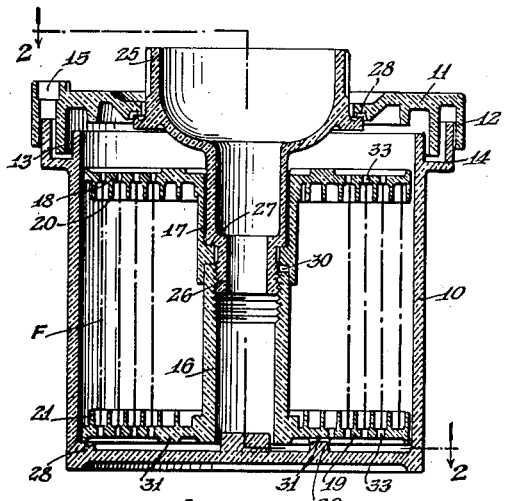

Referring to Figures 1 to 5 of the drawings, item 10 represents a cup-shaped receptacle or tank consisting of a suitable material, such as Bakelite, stainless steel, etc., not subject to attack by the treating fluid or fluids, and having an annular cover 11 positioned thereon in a manner to exclude light from passing into the interior of the tank. For the latter purpose, the upper edge of the tank is provided with an upturned angular flange 14 preferably formed integral therewith and providing an annular space therebetween and the upper or edge portion of the tank.

The cover 11 is likewise provided with a pair of downturned flanges 12 and 13 enclosing an annular space therebetween. The flange 12 of the cover 11 engages flange 14 of the tank thereby insuring a firm position of the cover and the inner flange 13 of the cover projects into the annular space formed by the flange 14 and the tank 12 to such an extent as to leave a free tortuous or circuitous path around the flange 13 to allow a fluid within the tank to pass therethrough and through the outlet or overflow opening 15 for emptying the tank in full daylight or securing a continuous flow of liquid therethrough without the necessity of removing the cover.

Positioned within the tank 10 is a reel or film holder comprising a hollow hub portion which consists of two detachable parts 16 and 17 and lower and upper reel members 19 and 18 connected to the portions 16 and 17, respectively, as shown. The members 18 and 19 are formed with spiral grooves or passageways 20 and 21, respectively, adapted to hold a film strip F wound thereon in spiral position and to maintain adjacent convolutions of the film properly spaced from each other.

The entrance portions 20' and 21' (see Figs. 3 and 4) to the spiral grooves 20 and 21 are opposite each other in order that the end of the film may be properly positioned and caused to pass spirally around the hub by following the grooves in the top and bottom members 18 and 19. The natural tendency of the film to curl causes it to easily follow these grooves by applying slight pressure on the film. In order to further facilitate the passing of the film through the spiral grooves, the walls of the grooves are formed with round projections or protuberances shown at 22 in Fig. 4 which serve the further purpose of keeping the edges of the film spaced from the groove walls and allow full access and circulation of the developing fluid to all parts of the light sensitive surface of the film. In order to facilitate the insertion of the film into the spiral guide grooves, the entrance portions 20' and 21' are formed with edges gradually tapering from the outer parts of the members 18 and 19 towards the bottom or inner surface of the spiral grooves 20 and 21 as seen from Fig. 3. This enables the insertion of the beginning of the film strip into the spiral grooves in full darkness, such as in a changing bag, without jamming or other difficulties encountered in devices of similar type heretofore known in the art.

Figure 4:
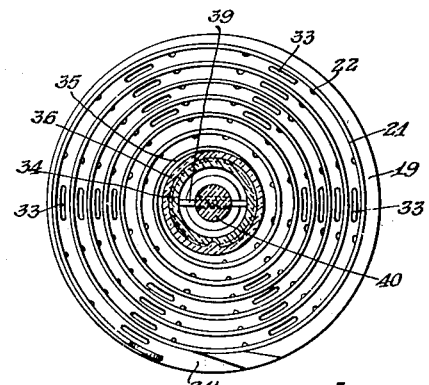
Fig. 4 is a cross-section taken on line 4—4 of Figure 3.

The top and bottom members 18 and 19 of the developing reel are furthermore provided with suitable perforations shown at 33 in Fig. 4 to allow developing or other treating fluid to freely circulate between the adjacent convolutions of the film and within the space between the outer convolution of the film and the inner vertical wall of the tank.

The two detachable portions 16 and 17 forming the hub of the developing reel are held together by a funnel shaped member 25 serving both as a cover for closing the central opening of the cover 11 and as a means for introducing the treating fluids, the latter passing through the member 25, the lower hub portion 16, and upwardly through the space between the outer convolution of the film F and inner wall of the tank 10 and through the perforations 33 of the lower reel member and upwardly between adjacent convolutions of the film. In assembling the reel, parts 16 and 17 are placed upon each other with the inner annular flange 27 of the part 17 which has a greater diameter than the part 16 resting on the upper edge of part 16 as shown. The upper edge of part 16 has a notch or depression 30 adapted to receive a corresponding projection or key of part 27 whereby the parts 16 and 17 may be properly positioned in such a manner that the entrance portions 20' and 21' of the spiral film guide are opposite each other as described hereinbefore. The parts 16 and 17 are then firmly screwed together by means of the member 26 which has a shoulder engaging the flange 27 of part 17 and a lower outwardly threaded surface engaging the inwardly threaded surface of part 16.

In the practical use of a device of this type, the parts 16, 17, 25 are first assembled in the manner described and the film inserted and wound on to the spiral. The reel with the film is then placed in the tank and the annular cover 11 firmly placed in position. The outer cover 11 and the inner cover or funnel shaped member 25 are spaced from each other by a circuitous gap 28 forming a light trap and preventing light from entering into the tank. These operations may be performed in a dark room or in a changing bag, while all subsequent manipulations, such as the introduction of the developing solution through the funnel 25, emptying of the tank through the overflow outlet, and the fixing and washing operations may be carried out in full daylight, as is readily understood.

In order to cause the developing fluid to act uniformly upon all parts of the sensitive surface of the film, there are provided further means for both rotating the reel and simultaneously moving it slightly in an axial direction whereby the fluid is efficiently agitated in such a manner as to cause even action on all parts of the sensitive surface of the film.

For the latter purpose, the lower reel member 19 is provided with a circular flange or rim 31 having notches therein spaced preferably at an equal angle or distance, in the example shown 120°, and adapted to engage similarly spaced elevations or projections 29 connected to or being integral with the bottom of the tank. In order to further maintain the reel in fixed position, its peripheral edge rests upon projections 28 preferably integral with the bottom of the tank in such a manner as to provide a space between the bottom of the tank and the reel allowing the developing or other fluid entering the hub of the reel to pass outwardly and upwardly between the outer convolution of the film F and the wall of the tank as well as between adjacent convolutions of the film, in such a manner that all parts of the sensitive surface are in contact with the developing fluid. By rotation of the member 25 which for this purpose has its outer surface provided with flutes or ribs to insure a firm hold, the notches of the annular flange 31 successively engage and disengage the elevations 29, thus causing the reel to revolve and at the same time move slightly up and down, thus insuring thorough agitation of the developing fluid. The notches of the rim 31 and the elevations 29 serve the further purpose of fixing the reel in a predetermined position relative to the tank as is desirable in full daylight loading and developing devices of the type to be described presently.

Figure 3:
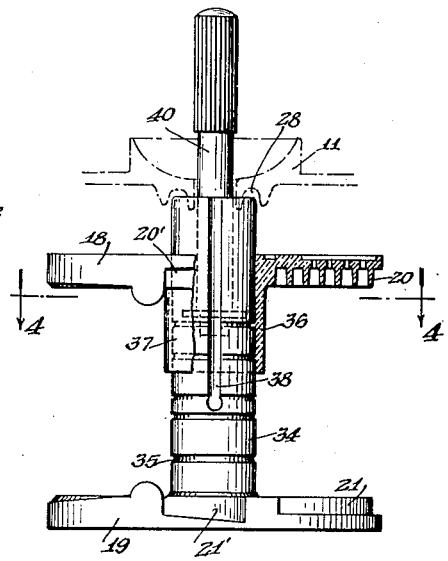
Fig. 3 shows an adjustable developing reel embodying features of construction for holding film strips of different standard sizes available on the market.
Figure 2:
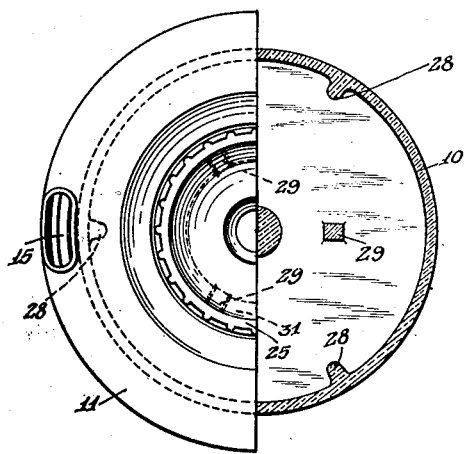
Fig. 2 is a partial bottom and top view of the tank shown in Figure 1.

Referring more particularly to Figs. 3 and 4, there is shown a film holding reel adapted for use with different predetermined film sizes by adjusting the distance between the upper and lower members 18 and 19 of the developing reel. For this purpose, the lower member 19 has a central hub portion 31 extending through substantially the entire axial length of the tank and separated from the inner edge of the cover 11 by a light-proof gap or light trap 28 similar as shown in Fig. 1. The upper reel member 18 has a hub portion 35 fitting over the hub 34 of the lower reel member in sliding engagement therewith. In order to secure sufficient friction between the hubs 34 and 36, the latter is provided with longitudinal slots shown at 37 adapted to impart to it a certain resiliency. The relative positions between the hubs 34 and 36 are fixed by the provision of a plurality of circular grooves 35 in the hub 34 adapted to engage an internal annular projection or rim of the hub 36. In this manner the upper reel portion may be fixed in definite predetermined positions corresponding to different standard film sizes by sliding it over the hub 34 of the lower reel portion until the inner annular projection snaps into one of the outer grooves 35 of the hub 34. In order to ensure that the entrance portions 20' and 21' of the spiral film guide are always opposite each other, the hub 34 has an axial groove 38 engaging a key or projection of the hub 36.

In the example shown, a separate stirring rod 40 (see Fig. 5) is provided which may be inserted in the hub 34 and has a slot 41 adapted to engage a bridge 39 diametrically connecting the inner surface of the hub 34. In this manner the reel may be turned by rotating the upper milled portion of the rod 40 and moved axially for agitation of the developing fluid in a manner similar as described in connection with Fig. 1.

Referring to Figs. 6 to 12, there is shown a developing tank of substantially similar construction to the tank described in Figs. 1 to 5, but embodying features of construction for feeding or inserting the film into the tank in full daylight so as to dispense completely with the necessity of a dark room, changing bag, or the like.

To this end, the tank according to Figs. 6 to 12 is provided with a light tight lateral film chamber from which the film may be fed from its spool or cartridge into the closed tank through a slot therein and wound on to the spiral of the developing reel. After the film has been inserted, the tank is displaced relative to the film chamber and the slot in the tank rendered liquid tight by the tightening of a rubber gasket or the like. In this manner the treating fluid is prevented from entering the film chamber and the latter as well as the film spool or magazine therein are protected against damage by the acids and other ingredients of the developing, fixing, or other treating solutions.

Figure 9:
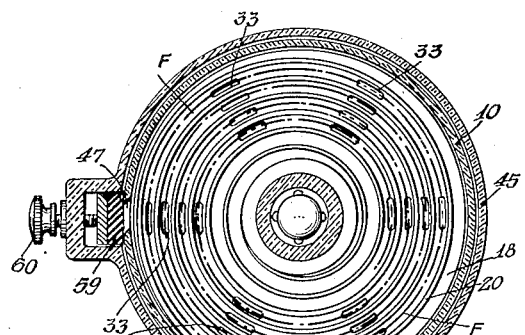
Fig. 9 is a horizontal sectional view taken on line 9—9 of Figure 6.
Figures 10, 11:
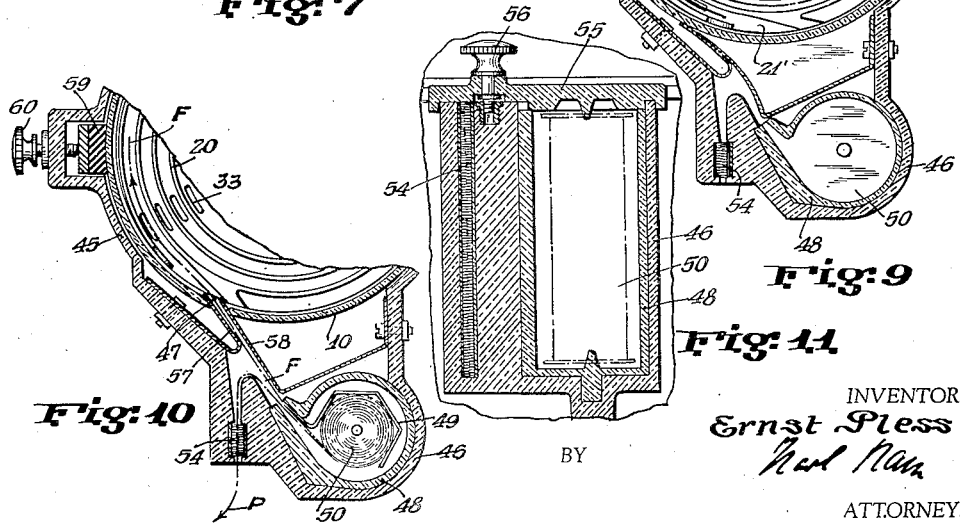
Figure 10 is a fractional view of Figure 9 illustrating the feeding mechanism for insertion of the film into the developing tank.
Figure 11 is a fractional cross-sectional view taken on line 11—11 of Figure 7.

Referring to the drawings, the inner tank 10 is provided with a film entering slot 47, Figures 9 and 10, and is surrounded by a cylindrical outer member or tank case 45 to which is connected preferably integral therewith, the film spool chamber 46. The latter, together with the member 45, may be rotated relatively to the inner tank 10 between two limit positions determined by suitable stop means. In one position the slot 47 is opposite the film chamber 46 (see Fig. 10) and in the other limit position the slot is opposite the gasket 59 mounted in the member 45 and adapted to be pressed against the slot 47 by means of a pair of thumb screws 60 to afford a liquid tight closure for the slot 47.

Referring more particularly to Fig. 10, this illustrates in greater detail the feeding or loading of the film into the developing tank. For this purpose the exposed film spool after removal from the camera is placed within a metal casette 49 and held therein by resilient force. The casette 49 is then placed in a film spool carrier 48 which latter snugly fits in the outer part of the chamber 46.

This construction is especially adapted for developing and treating films having a strip of paper covering the entire length of the film and extending beyond its ends so as to prevent the entrance of light in a manner well known.

After placing the exposed film spool in the holder 48, the paper leader P is drawn out to a sufficient length and passed through a light tight slot 54 provided with velvet linings for this purpose and arranged in the wall of the film chamber 46 adjacent to the film spool carrier 48. The chamber 46 has further mounted therein a pair of flat guide springs 57 and 58 which in the position shown enter the slot of the tank. In order to enable the guide springs 57 and 58 to readily enter the slot 47 of the tank when the latter is turned in a clock-wise direction relative to the other tank case member 45, the slot 47 is provided with oblique side walls as shown in the drawings.

After the film spool has thus been placed in position, a light tight lid 55 is positioned upon the chamber 46 and fixed thereto by means of a thumb screw 56 engaging a threaded insert in the chamber 46. The film is then fed into the tank and automatically wound on to the spiral of the developing reel by pulling out the film covering paper P whereby the film is unwound by friction with the covering paper strip and due to its tendency to curl readily enters the guides 57 and 58 and is fed into the tank and wound on to the spiral of the developing reel. In practice the covering paper P is pulled slowly and evenly in a horizontal direction through the light tight slit 54 until the number 1 on the covering paper of the film appears and a resistance is filled marking the point where the film is sealed to the covering paper.

In many makes of film the latter is only slightly attached to the covering paper strip and therefore detaches itself easily. When the paper strip is more strongly fastened to the film strip by means of a gum strip or the like, the film is pulled further until its edge appears at the slit 54. The film may then be separated from the covering paper by means of a knife or the like, whereupon the reel in the tank is rotated in a clock-wise direction by turning the member 25 and by this movement the film will be completed threaded on to the spiral of the reel in its entire length.

After the loading operation has been completed, it is necessary to make the inner tank liquid tight and in order to do this the screws 60 which have been tightened to prevent relative rotation between the inner and outer tank cases while the film is being inserted, are loosened and the inner tank 10 turned relative to the outer member 45 by holding its bottom flange provided with longitudinal flutes to afford a firm grip and turning the member 45 until a stop is reached and the gasket 59 is opposite the slot 47. Then the screws 60 are tightened again and the tank is now completely closed and ready for the developing process which may be carried out in a similar manner as in the case of a dark room loading tank shown and described in Figs. 1 to 6.

Figure 12:
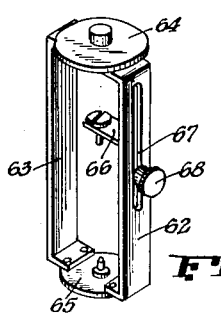
Figure 12 illustrates in perspective an adjustable film spool holder adapted for use with different sizes in a tank of the type shown by Figures 6 to 11.
Figure 6:
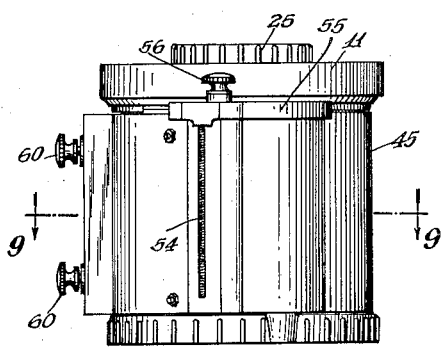
Figure 8:
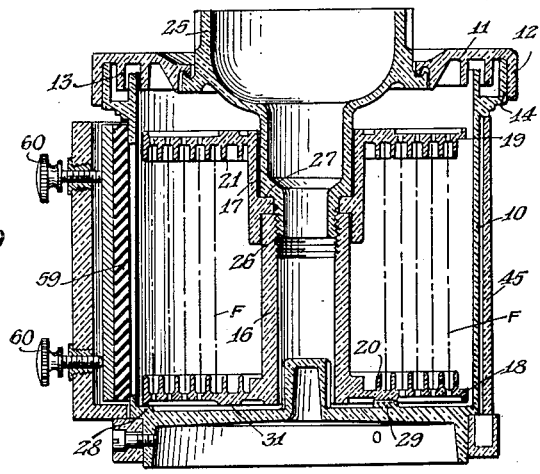
Fig. 8 is an enlarged vertical sectional view taken on line 8—8 of Figure 7.
Figure 7:
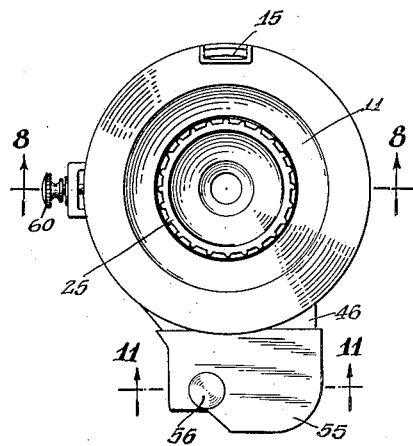
Fig. 7 is a top view of Figure 6.

If the tank is provided with developing reel adjustable for different film sizes as shown in Fig. 3, an adjustable film spool holder is used shown in detail in Fig. 12 in place of the film holder 48 designed for a fixed film size. The holder according to Fig. 12 substantially comprises a frame having a pair of side portions 62 and 63 and top and bottom members 64 and 65. The side portion 62 has a lengthwise slot 67 adapted to receive an extension of the upper film spool holding member 66 which has a pin adapted to engage the end of a film spool and is locked in position by means of a thumb screw 68. In this manner, spools of varying film sizes may be mounted in the film spool carrier. The film spool carrier with the film spool mounted therein is then placed in the lateral film chamber and the film fed into the developing tank in substantially the same manner as described before.

Referring to Figs. 13 to 17, there is shown a modification of a daylight loading and developing tank of the type according to Figs. 6 to 12, but especially adapted for use with perforated film such as moving picture film strips commonly used in miniature cameras. The tank shown substantially comprises the same parts as the tank described previously viz, an inner tank case 10 provided with a film entering slot 47 and an outer tank case or cylindrical member 45 having a light film chamber and rubber gasket connected therewith, a cover for the inner tank 11 with an overflow outlet 15, a film reel positioned in the inner tank and a special transporting or feeding mechanism for inserting and feeding the film on to the spiral of the developing reel in full daylight.

Films of this type as used in miniature cameras usually come in a cartridge or casette shown at 69, Figs. 15 and 16, placed in the side chamber 46 in a manner similar as described hereinbefore. The side chamber 46 is provided with a light tight lid 55 fitted thereto and adapted to be fastened and firmly held in position by means of a screw 56 passing through a down-turned flange of the lid as shown and engaging a threaded insert in the side wall of the chamber 46. The side chamber is further provided with a lateral cover 79 closing a lateral opening near the film gate through which the film passes into the developing tank and provided with velvet linings to afford a light tight closure. The cover 79 whose purpose will appear later, is held in place by a portion of the down-turned flange of the lid 55 engaging part of its upper surface as shown clearly from Figure 14. Before the covers 55 and 79 are applied, the end of the film F is pulled out from the casette or cartridge 69 and placed within the film gate formed by a pair of flat metal springs 57 and 58 passing through the slot 47 of the inner tank case 10 in a manner similar as shown in the previous figures. The film is fed into the tank and on to the spiral of the developing wheel by means of a sprocket wheel 70 engaging the perforations of the film and adapted to be rotated by a shaft journalled in the fixed upper wall of the side chamber 46 in a light tight manner and carrying a knurled knob 71 at its outer end. By turning the knob 71, the sprocket wheel 70 is caused to rotate and engage the film perforations and to feed the film into the developing chamber.

Figure 5:
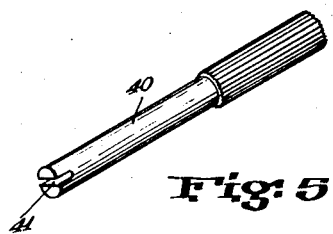
Fig. 5 shows in perspective view a stirring rod for use in connection with the tank shown by the previous figures.

In order to prevent rotation of the reel during the feeding of the film on to the same and displacement of the film entering slot 47 relative to the developing reel, the reel is locked in position such as by means of a separate locking rod 77 similar to the stirring rod shown and described in Fig. 5, but having a lateral projection or key 78 engaging a groove on the inner surface of cover 11 in such a manner as to prevent relative movement of the reel. The reel itself is constructed and spaced from the bottom of the tank in a manner as described hereinbefore and is preferably provided with an index upon its upper member to indicate the correct position when the upper and lower entrance portions of the film guide grooves are opposite each other and the slot 47 of the inner tank case. This position preferably coincides with one of the positions when the projections on the bottom wall of the tank engage the notches or grooves 29 of the peripheral flange of the lower reel member as described and shown in connection with Figs. 1 and 2.

After the film has been moved on to the developing reel, the rod 77 is removed and an ordinary stirring rod inserted in its place as shown in Fig. 5 for turning the reel and pulling the film completely in to the spiral guide and for agitating the developing fluid in a manner as described before. The inner tank is then turned relative to the outer member 46 and the slot 47 rendered liquid tight in substantially the same manner as described previously.

If the film end is connected to the inner core of the casette or cartridge loosely such as by friction, the same may be easily separated by a slight pull and turn of the sprocket 70. If, on the other hand, the end of the film is fastened tightly to the core in the casette or cartridge, the same has to be separated by means of a knife or the like. To accomplish this there are provided means for tightly closing the film gate 57 and 58 in a light tight manner by means of a stationary member 73 and a movable member 72 both being velvet lined and arranged at opposite sides of the guide springs 57 and 58 through which the film passes into the developing chamber. By moving member 72 against member 73, such as by tightening the thumb screw 74 engaging a threaded perforation in the side wall of the film spool chamber 46, the two springs or blades 57 and 58 of the film gate are pressed against each other to form a light tight seal. The covers 55 and 75 are then removed and the film separated from the cartridge and casette by cutting it with a knife or the like. The covers 55 and 75 are then applied again, the screw 74 loosened and the end of the film pulled completely into the spiral of the developing reel in a manner similar as described.

There are two general types of film casettes commonly used. In one type the film is passed to the outside through a velvet lined light tight slit and there is no need to open the casette when the film is to be withdrawn for moving it to the picture taking position in a camera. Casettes or cartridges of this type may be used in a daylight loading and developing device according to the invention in a manner described without further manipulations or adjustments, as is understood.

Another type of casette known comprises substantially an inner and outer casing relatively rotatable to each other and each having a slotlike opening therein. In one position of the casings, the slots are opposite each other and the film chamber open for withdrawal of the film. In the other position, the slots are relatively displaced and closed in a light tight manner. After a casette of this type has been placed in a camera, it is necessary to open the film chamber from the outside and the same is necessary if casettes of this type are used in connection with the developing tank of the type according to the invention. For this purpose, the cover 55 is provided with a rotatable knob 75 mounted thereon in a light tight manner and adapted to depress an unlocking pin 76 or the like of the casette 69, when the cover is placed and tightly screwed in position. By then turning the knob 75, an extension thereof engages a pin 77 connected with the inner casing of the casette thereby rotating the latter until the slots of the two casings are opposite and the casette opened for withdrawal of the film such as shown in Fig. 15. In order to prevent relative movement of the cover 11 and the tank 10, a groove and locking key arrangement may be provided, as will be understood.

From the above, it will be evident that while I have described my invention with specific reference to the embodiments described and shown in the drawings and presented for illustration, the novel features of the invention and the underlying inventive concept are susceptible of numerous variations and modifications differing from those herein presented and described and coming within the broad scope and spirit of the invention as defined in the appended claims.

I claim:

1. In a device for developing roll films, a receptacle, a reel positioned therein, said reel comprising a pair of hollow cylindrical members and a further hollow detachable member adapted to connect the inner ends of said cylindrical members to form a hub for said reel, and flange members connected to the outer ends of said cylindrical members having spiral passageways for holding a film strip wound therebetween.

2. In a device for developing roll films, a receptacle, a reel positioned therein, said reel comprising a pair of hollow cylindrical members and a further hollow detachable member adapted to connect the inner ends of said cylindrical members to form a hub for said reel, and integral perforated flange members at the outer ends of said cylindrical members formed with parallel spiral grooves to hold a film strip wound therebetween.

3. In a device for developing roll films, a cup-shaped receptacle, a light-proof removable cover therefor, a reel positioned within said receptacle, said reel comprising a pair of hollow cylindrical members and a further hollow detachable member adapted to connect the inner ends of said cylindrical members to form a hub for said reel, integral apertured flange members at the outer ends of said cylindrical members having spiral guide grooves therein to hold a film strip wound therebetween, means integral with said receptacle for spacing said reel from the bottom of said receptacle, and an extension of said further hollow member passed through said cover in a light tight manner to serve as an inlet for introducing a liquid into said receptacle.

4. In a device for developing roll films, a receptacle, a reel positioned therein comprising a pair of hub portions, a detachable member for firmly connecting said hub portions, top and bottom members connected to said hub portions having spiral passageways for holding a film strip therebetween, one of said hub portions having a guide groove and the other hub portion having a projecting key engaging said groove for fixing the relative position of said top and bottom members.

5. In a device for developing roll films, a receptacle, a reel positioned therein, said reel having a hub with top and bottom members connected thereto and means for holding a film strip spirally wound around said hub, means whereby a treating fluid in said receptacle fills the space between the spiral convolutions of the film, and further means for imparting reciprocating movement to said reel in an axial direction simultaneously with rotation thereof.

6. In a device for developing roll films, a receptacle, a reel positioned therein, said reel having a hub with top and bottom members connected thereto and means for holding a film strip spirally wound around said hub, means whereby a treating fluid in said receptacle fills the space between adjacent convolutions of the film, spacing means intervening between the bottom of said receptacle and said reel, said spacing means being adapted to cause reciprocating axial movement of said reel simultaneously with rotation thereof.

7. In a device for developing roll films, a receptacle, a reel positioned therein, said reel having a hub with top and bottom members connected thereto and means for holding a film spirally wound around said hub, means whereby a treating fluid in said receptacle fills the space between adjacent convolutions of the film, spacing means connected to the bottom of the receptacle and to said reel, said spacing means having elevations and depressions adapted to alternately engage and disengage each other when the reel is rotated thereby causing axial reciprocating movement of said reel.

8. In a device for developing roll films, a receptacle, a reel positioned therein, said reel having a hub with top and bottom members connected thereto and means for holding a film strip spirally wound around said hub, means whereby a treating fluid in said receptacle fills the space between adjacent convolutions of the film, a circular flange connected to the bottom of said reel having notches therein spaced at equal angular distances, projections connected to the bottom of said receptacle adapted to alternately engage and disengage said notches when said reel is rotated thereby imparting reciprocating movement to said reel simultaneously with rotation thereof.

9. In a device for developing roll films, a receptacle, a reel positioned therein, said reel having a hollow hub with top and bottom members connected thereto and means for holding a film strip spirally wound around said hub, the bottom of said receptacle having projections supporting said reel whereby liquid introduced through said hub is forced outwardly and in an upward direction between the outer convolutions of the film and the inner wall of the receptacle.

10. In a device for developing roll films, a receptacle, a reel poistioned therein, said reel having a hollow hub with apertured top and bottom members connected thereto and means for holding a film strip spirally wound around said hub, the bottom of said receptacle having projections supporting said reel whereby liquid introduced through said hub is forced outwardly and in an upward direction between the outer convolutions of the film and the adjacent wall of the receptacle and through the apertures of said reel members and between adjacent convolutions of the film.

11. In a device for developing roll films, a receptacle having an open end, a light-tight cover therefor, a reel positioned within said receptacle, said reel having a hub with top and bottom members connected thereto and provided with spiral passageways for holding a film strip spirally wound around said hub, a side chamber having a detachable light-tight cover communicating with said receptacle through a slot therein, means for positioning a film spool in said side chamber, and means for feeding the film from said spool through said slot and winding it on to said reel while said receptacle and side chamber are closed light-tight.

12. In a device for developing roll films, a receptacle having an open end, a detachable light-tight cover therefor, a reel positioned in said receptacle, said reel having a hub with top and bottom members connected thereto and provided with spiral passageways for holding a film strip wound around said hub, a side chamber having a detachable light-tight cover communicating with said receptacle through a slot therein, means for positioning a film spool in said side chamber, further means for feeding the film from said spool through said slot and winding it on to said reel while said receptacle and side chamber are closed light-tight, and means for preventing rotation of said reel during the winding of the film thereon.

13. In a device for developing roll films, an inner cylindrical receptacle having an open end, a removable light-tight cover therefor, a reel positioned within said receptacle, said reel having a spiral passageway adapted to hold a film strip wound thereon, an outer casing engaging said receptacle relatively rotatable therewith, a side chamber having a removable light-tight cover connected to said outer casing and communicating with said receptacle through a slot therein in one relative position to said receptacle, means for positioning a film spool in said side chamber, further means for feeding the film from said spool through said slot and winding it on to said reel while said receptacle and side chamber are closed light-tight, and a gasket element connected to said casing adapted to close said slot in a different relative position of said receptacle and winding.

14. In a device as claimed in claim 13 as adapted for use with perforated film strips in which said last mentioned means is comprised of a sprocket wheel mounted in said side chamber and adapted to engage the perforations of the film, and means for rotating said sprocket wheel from the outside through a shaft mounted in a light-tight manner in said side chamber.

15. A device as claimed in claim 13 including resilient guide means in said side chamber through which the film is passed from said spool into said receptacle, said guide means being adapted to move into and out of said slot in said receptacle when the outer casing is displaced from one to the other limit position relative to said receptacle.

16. In a device as claimed in claim 13 adapted for use with films having a protective paper strip covering the film including a light-tight slit in said side chamber for receiving the paper covering strip whereby the film may be fed and wound on to said reel by pulling the paper covering through said slit.

17. In a device as claimed in claim 13 including positioning means for fixing the relative position of the entrance portions to the spiral passageways of said reel opposite to said slot of said receptacle, and further means for preventing rotation of said reel relative to said receptacle during the winding of the film on to said reel.

18. In a device as claimed in claim 13 including a pair of flat springs mounted in said side chamber forming a guide for the film passing from said spool into said receptacle, said springs being adapted to enter into and move out of the slot of said receptacle when rotating the outer casing from one to its other limit position relative to said receptacle.

19. In a device as claimed in claim 13 including a pair of flat springs serving as the film guide mounted in said side chamber and passing through said slot, and means for tightly pressing said springs together to form a light-tight closure.

20. In a device for developing roll films, a receptacle having an open end, a light-tight cover therefore, a film holder positioned within said receptacle, said holder being adapted to have a film strip spirally wound thereon, a side chamber having a detachable light-tight cover and communicating with said receptacle through a slot therein, means for positioning a film spool in said side chamber, means for feeding the film from said spool through said slot and winding it on to said holder while said receptacle and side chamber are closed light-tight, a removable gasket adapted to close said slot, and light-proof fluid inlet and output means for filling and emptying said receptacle.

ERNST PLESS.